United States Patent [19]

Besecke et al.

[11] Patent Number: 5,476,907
[45] Date of Patent: Dec. 19, 1995

[54] POLY(METH) ACRYLIMIDES OF IMPROVED COLOR

[75] Inventors: Siegmund Besecke, Hameln; Andreas Deckers, Ludwigshafen; Harald Lauke, Mannheim, all of Germany

[73] Assignee: BASF Aktiengesellschaft, Ludwigshafen, Germany

[21] Appl. No.: 320,386

[22] Filed: Oct. 11, 1994

Related U.S. Application Data

[63] Continuation of Ser. No. 72,044, Jun. 7, 1993, abandoned.

[30] Foreign Application Priority Data

Jun. 13, 1992 [DE] Germany ............ 42 19 479.2

[51] Int. Cl.$^6$ ...................................... C08F 8/32
[52] U.S. Cl. .................... 525/330.4; 525/330.5; 525/340.379
[58] Field of Search ................. 525/330.4, 330.5

[56] References Cited

U.S. PATENT DOCUMENTS

| | | |
|---|---|---|
| 2,146,209 | 2/1939 | DeWitt . |
| 3,244,679 | 4/1966 | Schröder et al. ............ 260/86.1 |
| 4,246,374 | 1/1981 | Kopchik . |

FOREIGN PATENT DOCUMENTS

| | | |
|---|---|---|
| 234726 | 9/1987 | European Pat. Off. . |
| 328140 | 8/1989 | European Pat. Off. . |
| 331052 | 9/1989 | European Pat. Off. . |
| 376749 | 7/1990 | European Pat. Off. . |
| 396336 | 11/1990 | European Pat. Off. . |

OTHER PUBLICATIONS

Research Disclosure Jan. 1991, Inerting of Feedstock in Polyglutarimide Manufacture.

*Primary Examiner*—Bernard Lipman
*Attorney, Agent, or Firm*—Keil & Weinkauf

[57] ABSTRACT

A polymer useful for preparing moldings and comprising essentially units of the formula I

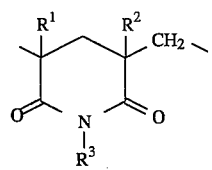

where $R^1$ and $R^2$ are each hydrogen or methyl, and $R^3$ is hydrogen, $C_1$–$C_{18}$-alkyl, $C_5$–$C_8$-cycloalkyl, $C_6$–$C_{10}$-aryl or $C_6$–$C_{10}$-aryl-$C_1$–$C_4$-alkyl, each of which may be monosubstituted, disubstituted or trisubstituted by radicals selected from the group consisting of $C_1$–$C_4$-alkyl, $C_1$–$C_4$-alkoxy and halogen, is obtainable by reacting a polymer based on $C_1$–$C_{20}$-alkyl esters of (meth)acrylic acid with a primary amine of the general formula II $$R^3NH_2 \qquad \text{II}$$

in the presence of a compound selected from the group consisting of phosphinic acid and phosphonic acid and their alkali metal, alkaline earth metal, aluminum and ammonium salts, wherein the ammonium ion can be monosubstituted, disubstituted, trisubstituted or tetrasubstituted by $C_1$–$C_4$-alkyl and/or $C_5$–$C_8$-cycloalkyl, or mixtures thereof.

2 Claims, No Drawings

POLY(METH) ACRYLIMIDES OF IMPROVED COLOR

This application is a continuation of application Ser. No. 08/072,044, filed on Jun. 7, 1993 now abandoned.

The present invention relates to a polymer comprising essentially units of the formula I

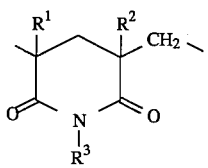

where $R^1$ and $R^2$ are each hydrogen or methyl, and $R^3$ is hydrogen, $C_1$–$C_{18}$-alkyl, $C_5$–$C_8$-cycloalkyl, $C_6$–$C_{10}$-aryl or $C_6$–$C_{10}$-aryl-$C_1$–$C_4$-alkyl, each of which may be monosubstituted, disubstituted or trisubstituted by radicals selected from the group consisting of $C_1$–$C_4$-alkyl, $C_1$–$C_4$-alkoxy and halogen, obtainable by reacting a polymer based on $C_1$–$C_{20}$-alkyl esters of (meth)acrylic acid with a primary amine of the general formula II $R^3NH_2$  II in the presence of a compound selected from the group consisting of phosphinic acid and phosphonic acid and their alkali metal, alkaline earth metal, aluminum and ammonium salts, wherein the ammonium ion can be monosubstituted, disubstituted, trisubstituted or tetrasubstituted by $C_1$–$C_4$-alkyl and/or $C_5$–$C_8$-cycloalkyl, or mixtures thereof.

Polymers based on $C_1$–$C_{10}$-alkyl esters of (meth)acrylic acid, the most common representatives of which are methyl methacrylate and methyl acrylate, are notable for excellent transparency and weathering stability. For these reasons polymethyl methacrylates (PMMAs) are used for example for manufacturing optically demanding parts such as lenses and for lamp coverings.

However, there are a number of uses for which such acrylate molding materials are insufficiently heat distortion resistant. One of the possible solutions is to raise the glass transition temperature by polymer-analogous reaction of, for example, PMMA with primary amines (imidation) to form cyclic imide structures (see equation 1):

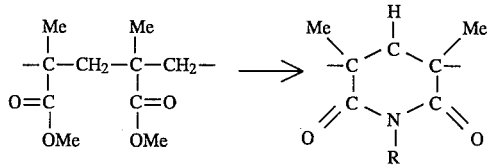

The imidation of PMMA in aqueous medium is known (see for example EP-A-376,749, page 6, lines 21–26) to lead, owing to the free carboxyl groups present, to a reduced flowability of the polymer and to an increased water regain, to greater proneness to stress crack corrosion and to a reduction in the weathering resistance.

The imidation of PMMA in an anhydrous medium is described for example in U.S. Pat. No. 2,146,209, where the reaction is carried out in solvents such as biphenyl and diethylene glycol. In addition to involving the use of solvents that are toxic (biphenyl) and difficult to recover because of their high boiling points, this process gives nonuniformly imidated products which show reduced transparency and have an inherent yellow color.

EP-B-234,726 describes a process for reacting methacrylic polymers with anhydrous amines in the presence of solvent mixtures (aromatic/alcohol) at up to 350° C. Antioxidants such as bulky phenols or organophosphorus compounds can be added during the reaction. This does reduce the degradation of the polymer chains, but does not lead to a less yellow product (compared with products produced by this process without the addition of these antioxidants).

The position is similar with the process described in U.S. Pat. No. 4,246,374, wherein PMMA is imidated on an extruder in the absence of solvent. Here too the high reaction temperature results in the formation of water, which leads to partially hydrolyzed polymers having acid numbers of about 1 equivalent per kilogram of polymer and also to reduced transparency. A further disadvantage are by-products such as ethers and di- and trialkylamines.

EP-A-396,336 describes mixtures of polymethacrylimides with bulky organophosphorus compounds, which show good processing stability in injection and extrusion molding. However, products having a yellowness ($Y_i$ value) of below 1.99 are not described.

RD 321,114 describes a process for ameliorating the yellowness of polymethacrylimides by carrying out the imidation in an oxygen-free atmosphere. However, removal of the oxygen requires for example costly distillations.

It is an object of the present invention to provide polymethacrylimides and polyacrylimides that have an improved yellowness index without impairing the other, favorable properties of polymeth(acrylimides) such as thermoplastic processibility, heat distortion resistance and transparency.

We have found that this object is achieved by the molding materials defined at the beginning.

We have also found a process for preparing these molding materials, a use for them in preparing moldings, and moldings that are obtainable from these molding materials.

We have also found that the molding materials of the invention, when subjected to multiple processing, for example multiple extrusion, show a smaller increase in the yellowness index $Y_i$ than the prior art molding materials.

The imidation can be carried out in solution or in the melt by known processes, for example by the processes described in EP-A-234,726 and U.S. Pat. No. 4,246,374.

The polymers of the invention are obtainable by adding a phosphorus compound to the reaction mixture before, during or after the imidation.

Suitable phosphorus compounds are phosphinic acid ($H_3PO_2$), phosphonic acid ($H_3PO_3$), their alkali metal, alkaline earth metal and aluminum salts and also lithium, sodium, potassium, beryllium, magnesium, calcium and aluminum phosphinates, lithium, sodium, potassium, beryllium, magnesium, calcium and aluminum phosphonates, their hydrogen and dihydrogen derivatives such as lithium, sodium, potassium, beryllium, magnesium, calcium and aluminum hydrogenphosphinates and hydrogenphosphonates, preferably disodiumhydrogenphosphonate, lithium, sodium, potassium, beryllium, magnesium, calcium and aluminum dihydrogenphosphinates and dihydrogenphosphonates, preferably sodium dihydrogenphosphinate, potassium dihydrogenphosphinate, and also their ammonium salts, wherein the ammonium ion can be monosubstituted, disubstituted, trisubstituted or tetrasubstituted by $C_1$–$C_4$-alkyl and/or $C_5$-/$C_8$-cycloalkyl, such as ammonium, trimethylcetylammonium, tetramethylammonium dihydrogenphosphinate, preferably ammonium dihydrogenphosphinate, or mixtures thereof.

The phosphorus compounds are in general used within the range from 0.01 to 5, preferably from 0.1 to 1, % by weight, based on the amount of polymer to be imidated. If the amount is less than 0.01% by weight, there is no noticeable effect from observations to date. If the amount is more than 5% by weight, the polymer will in general become cloudy and deteriorate in impact toughness.

If the imidation is carried out in the melt, for example on an extruder or in a tubular reactor equipped with static mixing elements, the phosphorus compounds of the invention can be introduced into the reaction zone separately or preferably dissolved in the imidating amine or mixed with the polymer to be imidated.

Preference is given to imidation in solution, and the components are preferably dissolved prior to the reaction.

For the purposes of the present invention, polymers based on $C_1$–$C_{20}$-alkyl esters of (meth)acrylic acid include both homopolymers and copolymers, which copolymers may additionally contain other ethylenically unsaturated comonomers.

The preferred $C_1$–$C_{20}$-alkyl methacrylates are the $C_1$–$C_4$-alkyl esters such as methyl methacrylate (MMA), ethyl methacrylate, propyl methacrylate, n-butyl methacrylate, isobutyl methacrylate and tert-butyl methacrylate, of which methyl methacrylate is particularly preferred, and also mixtures thereof.

Preferred $C_1$–$C_{20}$-alkyl acrylates are the $C_1$–$C_4$-alkyl esters such as methyl acrylate (MA), ethyl acrylate, propyl acrylate, n-butyl acrylate, isobutyl acrylate and tert-butyl acrylate, of which methyl acrylate is particularly preferred, and also mixtures thereof.

Suitable ethylenically unsaturated comonomers are acrylic acid, methacrylic acid, maleic acid derivatives such as imides and $C_1$–$C_{10}$-alkyl esters, itaconic acid derivatives such as imides and $C_1$–$C_{10}$-alkyl esters, acrylonitrile, methacrylonitrile, styrene, α-methylstyrene, ethylene, propylene, butadiene and also mixtures thereof.

The polymers can be prepared in a single or multiple stage process, although in the case of a multiple stage polymerization at least the outer stage must contain groups that can be imidated.

In general, the polymers comprise more than 50, preferably more than 80, % by weight of $C_1$–$C_{20}$-alkyl esters of methacrylic acid and/or acrylic acid. Of particular advantage from observations to date are polymers comprising from 80 to 100% by weight of methyl methacrylate and from 0 to 20% by weight of methyl acrylate within a number average molecular weight range ($M_n$) of from 20,000 to 300,000 g/mol.

The primary amine used, $R^3NH_2$, can be any known primary amine. Preference is given to an amine selected from the group consisting of ammonia, $C_1$–$C_{18}$-alkylamines, $C_5$–$C_8$-cycloalkylamines, $C_6$–$C_{10}$-arylamines and $C_6$–$C_{10}$-aryl-$C_1$–$C_4$-alkylamines, in which aryl may be monosubstituted, disubstituted or trisubstituted by $C_1$–$C_4$-alkyl, $C_1$–$C_4$-alkoxy and halogen such as fluorine, chlorine or bromine.

Examples are ammonia, methylamine, ethylamine, n-propylamine, isopropylamine, n-butylamine, 1-methylpropylamine, 2-methylpropylamine, 1,1-dimethylethylamine, n-pentylamine, 1-methylbutylamine, 2-methylbutylamine, 3-methylbutylamine, 2-dimethylpropylamine, 1-ethylpropylamine, n-hexylamine, n-heptylamine, n-octylamine, n-nonylamine, n-decylamine, n-undecylamine, n-dodecylamine, stearylamine, cyclopentylamine, cyclohexylamine, cycloheptylamine, cyclooctylamine, aniline, 2-, 3-, 4-methylaniline, 2-, 3-, 4-methoxyaniline, 2-, 3-, 4-chloroaniline, 2-, 3-, 4-bromoaniline, benzylamine, phenethylamine and phenylpropylamine, particularly preferably cyclohexylamine.

In a preferred embodiment for preparing the poly(meth)acrylimides, the alcohol that is formed by the aminolysis of the ester groups is removed from the reaction mixture. This is particularly advantageously achievable by continuously distilling off the alcohol. For this it is advantageous to use for the imidation an amine that has a higher boiling point than the alcohol to be removed from the reaction mixture, so that no or only insignificant amounts of amine are removed at the same time.

In principle, it is also possible to use amines having the same or a lower boiling point than the alcohol to be distilled off, for example by separating the amine removed with the alcohol from the alcohol by further distillation and recirculating it into the reaction mixture. However, the version described here (boiling point of amine>boiling point of alcohol) is preferred because of the simpler reaction control management.

The reaction is in general carried out by heating a mixture of (meth)acrylate polymer and amine, preferably in a solvent, to the boil in the absence of oxygen and continuously removing the alcohol formed in the course of the reaction from the reaction mixture by distillation.

The amine can be added right at the start of the reaction or for example continuously at the rate of its consumption.

The weight ratio of amine used to acrylate polymer is in general within the range from 1:1 to 400:1, preferably from 1:1 to 200:1.

The solvent used can be basically any aprotic polar solvent such as

N,N'-disubstituted cyclic or acyclic carboxamides such as dimethylformamide, diethylformamide, dimethylacetmide or diethylacetamide N-methyl-2-pyrrolidone, N-ethyl-2-pyrrolidone N,N,N',N'-tetrasubstituted cyclic or acyclic ureas such as tetramethylurea N-substituted cyclic or acyclic (poly)amines such as dicyclohexylmethylamine, dimethylcyclohexylamine, N,N,N',N'-tetramethylethylenediamine or N,N,N',N'-tetramethylhexamethylenediamine ethers with a high boiling point such as ethylene glycol dimethyl ether and diethylene glycol dimethyl ether alkylene carbonates such as ethylene carbonate and propylene carbonate and other customary aprotic and polar solvents such as hexamethylphosphoramide, nitroalkanes such as nitromethane, dimethyl sulfoxide, diphenyl sulfoxide and sulfolane, of which N-methylpyrrolidone is preferred.

The weight ratio of solvent used to polymer is in general within the range from 1:1 to 100:1, preferably from 1:1 to 10:1.

The reaction temperature is in general within the range from 100° to 280° C., preferably within the range from 120° to 220° C. The reaction pressure is in general uncritical. The reaction is in general carried out within the range from 80 to 250 kPa, preferably under atmospheric pressure.

The choice of pH range is likewise uncritical and because of the amine or ammonia used is in general above 7.

The reaction time is in general within the range from 1 to 20 h, preferably from 1 to 10 h.

Furthermore, the reaction mixture may include catalysts in amounts within the range from 0.01 to 10, preferably 0.05 to 1, % by weight, based on the polymer used, to speed the reaction. Examples are tertiary amines such as tricyclohexylamine, substituted guanidines such as 1,1,3,3-tetramethylguanidine and 1,3-diphenylguanidine tetrasubstituted alkylammonium compounds such as trimethylstearylammonium chloride organic titanium compounds such as tetrapropoxytitanium and tetrabutoxytitanium organic tin compounds such as dibutyltin oxide and dibutyltin didodecanoate aromatic amines such as quinoline, isoquinoline, 4-benzylpyridine, 4-phenylpyridine, 2-hydroxypyridine, 1,3-, 1,4- and 2,3-benzodiazine and 2,2'-, 2,3'- and 2,4'-bipyridyl imides such as N,N'-dicyclohexylcarbodiimide and also antimony trioxide, tin dioxide, sodium amide, sodium and potassium alkoxides such as sodium methoxide and potassium methoxide, ammonium chloride and ammonium iodide.

The poly(meth)acrylimide of the invention can be processed into moldings in a conventional manner, for example by injection molding, extrusion or sintering.

The novel poly(meth)acrylimides and moldings produced from them are advantageous over known polymers prepared from PMMA and amines in having a yellowness index of <1.8 if they are prepared by the preferred embodiment, removal of the alcohol of aminolysis from the reaction mixture. If they are prepared by known methods, the polymers prepared according to the invention have distinctly better $Y_i$ values than the known polymethacrylimides. Furthermore, the polymers prepared according to the invention yellow on multiple processing less rapidly than the prior art polymethacrylimides. Finally, the polymers of the invention have better APHA color numbers than the polymethacrylimides.

EXAMPLES

Examples 1–6

In a reaction vessel equipped with a packed column a mixture of 200 g of PMMA (comprising 99% by weight of MMA and 1% by weight of MA and having a number average molecular weight $M_n$ of 115,000 g/mol), 150 g of cyclohexylamine, 600 g of N-methylpyrrolidone and 0.5 g of phosphorus compound (see Table 1) was heated to the boil under nitrogen. The first methanol was withdrawn from the top of the column after about 1 h, and for the next 6 h the distillation was continued in such a way that the temperature at the top of the column was never higher than 70° C. 70 g of distillate were obtained. Subsequently the excess amine was distilled off and the polymethacrylimide was precipitated in methanol and then dried.

The results of the quality control tests are shown in Table 1.

Comparative Example 1

Example 1 was repeated without the addition of phosphorus compound. The results of the quality control tests are shown in Table 1.

Examples 7–8

(analogously to EP-B-234,726)

In an autoclave a solution of 220 g of PMMA of the same composition as in Example 1 in 600 g of 90/10 w/w toluene/methanol was admixed with 150 g of cyclohexylamine and 0.5 g. of phosphorus compound (see Table 2) and heated to 230° C. After 4 h the mixture was cooled down and the polymer formed was precipitated in methanol and dried.

The results of the quality control tests are shown in Table 2.

Comparative Examples 2 and 3

(analogously to EP-B-234,726)

Example 7 was repeated once with tricresyl phosphite (Comparative Example 2) and once without the addition of phosphorus compound (Comparative Example 3).

The results of the quality control tests are shown in Table 2.

Examples 9–11

(analogously to U.S. Pat. No. 4,246,374)

On a twin-screw extruder (ZSK-40) with corotating, intermeshing screws, a mixture of 9975 g of PMMA of the same composition as in Example 1 and 25 g of phosphorus compound (see Table 3) was continuously reacted at 270° C. with 5 kg/h of cyclohexylamine. The reaction time was 0.1 h. Downstream of the reaction zone the polymer melt was devolatilized on the same extruder and granulated.

The results of the quality control tests are shown in Table 3.

Comparative Example 4

(analogously to U.S. Pat. No. 4,246,374)

Example 9 was repeated without the addition of phosphorus compound.

The results of the quality control tests are shown in Table 3.

Example 12

(multiple processing)

On a twin-screw extruder (ZSK-40) with corotating, intermeshing screws, 15 kg/h of the polymethacrylimide prepared in Example 10 was continuously subjected to multiple extrusion at 270° C. The reaction time was 0.1 h. Downstream of the reaction zone the polymer melt was devolatilized on the same extruder and granulated. After each extrusion a roundel (d=80 mm, h=6 mm) was pressed at 240° C. and its yellowness index $Y_i$ measured.

The results of the quality control tests are shown in Table 4.

Comparative Example 5

(multiple processing)

Example 12 was repeated with the polymer of Comparative Example 4 (no addition of phosphorus compound).

The results of the quality control tests are shown in Table 4.

The $Y_i$ yellowness index was determined in accordance with DIN 6 167 on roundels (d=80 mm, height=6 mm).

The APHA color number (see Römpps Chemie-Lexikon, volume 2, 8th edition, page 1243) was determined in a Beckmann DU Series 60 spectrometer on a 10% strength by weight solution in N-methylpyrrolidone.

TABLE 1
EXAMPLES 1 TO 6, COMPARATIVE EXAMPLE 1

| Example No. | Phosphorus compound | APHA color number | $Y_i$ |
|---|---|---|---|
| 1 | $H_3PO_2$ | 51 | 0.8 |
| 2 | $NaH_2PO_2$ | 69 | 0.9 |
| 3 | $KH_2PO_2$ | 72 | — |
| 4 | $NH_4H_2PO_2$ | 43 | 0.8 |
| 5 | $H_3PO_3$ | 103 | 1.2 |
| 6 | $Na_2HPO_3$ | 121 | — |
| Comparative Example 1 | — | 203 | 1.8 |

TABLE 2
EXPERIMENTS ANALOGOUS TO EP-B-234,726

| Example No. | Phosphorus compound | APHA color number | $Y_i$ |
|---|---|---|---|
| 7 | $H_3PO_2$ | 131 | 2.1 |
| 8 | $NH_4H_2PO_2$ | 109 | 2.1 |
| Comparative Example 2 | Tricresyl phosphite | 531 | 6.9 |
| Comparative Example 3 | — | 334 | 3.2 |

TABLE 3
EXPERIMENTS ANALOGOUS TO US-A-4,246,374

| Example No. | Phosphorus compound | $Y_i$ |
|---|---|---|
| 9 | $H_3PO_2$ | 2.0 |
| 10 | $NH_4H_2PO_2$ | 1.8 |
| 11 | $Na_2HPO_3$ | 2.3 |
| Comparative Example 4 | — | 4.1 |

TABLE 4
MULTIPLE PROCESSING

| Example No. | PMI from exp. No. | $Y_i$ | $2x^{1)}$ | $3x^{1)}$ | $4x^{1)}$ |
|---|---|---|---|---|---|
| 12 | 10 | 1.8 | 2.1 | 2.8 | 3.6 |
| Comparative Example 5 | 4 | 4.1 | 6.3 | 9.8 | — |

$^{1)}Y_i$ after 2-, 3- and 4-fold extrusion

We claim:

1. A polymer having an APHA color number no greater than 131 consisting essentially of units of formula I

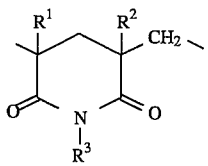

where $R^1$ and $R^2$ are each hydrogen or methyl, and $R^3$ is $C_5-C_8$-cycloalkyl, obtained by a process consisting essentially of reacting a polymer based on $C_1-C_{20}$-alkyl esters of (meth)acrylic acid with an amine of the formula II $$R^3NH_2 \qquad\qquad II$$

in the presence of a compound selected from the group consisting of phosphinic acid and phosphonic acid and their alkali metal, alkaline earth metal, aluminum and ammonium salts, wherein the ammonium ion can be monosubstituted, disubstituted, trisubstituted or tetra-substituted by $C_1-C_4$-alkyl and/or $C_5-C_8$-cycloalkyl, or mixtures thereof.

2. A polymer as recited in claim 1, wherein the primary amine is cyclohexylamine.

* * * * *